(12) United States Patent
Buschjohann et al.

(10) Patent No.: US 8,684,382 B2
(45) Date of Patent: Apr. 1, 2014

(54) AXLE BRACKET FOR MOTOR VEHICLES

(75) Inventors: Thomas Buschjohann, Nordstemmen (DE); Karsten Hoppe, Soehlde (DE); Juergen Eickmann, Schellerten (DE); Michael Wagner, Munich (DE)

(73) Assignee: KSM Castings Group GmbH, Hildesheim (DE)

( * ) Notice: Subject to any disclaimer, the term of this patent is extended or adjusted under 35 U.S.C. 154(b) by 148 days.

(21) Appl. No.: 12/736,953

(22) PCT Filed: May 20, 2009

(86) PCT No.: PCT/DE2009/000713
§ 371 (c)(1),
(2), (4) Date: Nov. 24, 2010

(87) PCT Pub. No.: WO2009/143812
PCT Pub. Date: Dec. 3, 2009

(65) Prior Publication Data
US 2011/0068551 A1  Mar. 24, 2011

(30) Foreign Application Priority Data

May 26, 2008 (DE) .......................... 10 2008 025 100
May 28, 2008 (DE) .......................... 10 2008 025 625
Sep. 20, 2008 (DE) .......................... 10 2008 048 125

(51) Int. Cl.
*B62D 21/12* (2006.01)
*B62D 21/11* (2006.01)
*B62D 21/00* (2006.01)

(52) U.S. Cl.
USPC .................... 280/124.109; 280/785; 180/312; 180/311

(58) Field of Classification Search
USPC ........... 280/124.109, 781, 785; 180/311, 312; 296/204, 205
See application file for complete search history.

(56) References Cited

U.S. PATENT DOCUMENTS

| | | | |
|---|---|---|---|
| 3,441,289 A * | 4/1969 | Ryszewski et al. | 280/788 |
| 4,275,918 A * | 6/1981 | Franco | 296/190.07 |
| 4,501,436 A * | 2/1985 | Ishida | 280/124.108 |
| 4,723,791 A * | 2/1988 | Miura et al. | 280/124.109 |
| 4,943,092 A * | 7/1990 | Haraguchi | 280/124.109 |
| 5,280,957 A * | 1/1994 | Hentschel et al. | 280/788 |
| 5,560,651 A * | 10/1996 | Kami et al. | 280/788 |
| 5,611,569 A * | 3/1997 | Sekiguchi et al. | 280/788 |

(Continued)

FOREIGN PATENT DOCUMENTS

| | | |
|---|---|---|
| DE | 27 12 083 | 9/1978 |
| DE | 10 2005 062 330 | 6/2007 |
| DE | 10 2006 038 921 | 2/2008 |
| EP | 1 787 894 | 5/2007 |

OTHER PUBLICATIONS

International Search Report.

*Primary Examiner* — Toan To
*Assistant Examiner* — Barry Gooden, Jr.
(74) *Attorney, Agent, or Firm* — Collard & Roe, P.C.

(57) ABSTRACT

The invention relates to an axle support for motor vehicles, for receiving components of the chassis of the motor vehicle. The axle support comprises frame side members (2, 3) running substantially in the driving direction, each having at least one cast connection point (5, 6), and a pipe section (7) that adjoins the cast connection point. The pipe section has an at least half-shell form in the region of the connection to the cast connection point.

21 Claims, 5 Drawing Sheets

(56) References Cited

U.S. PATENT DOCUMENTS

Figure 1:
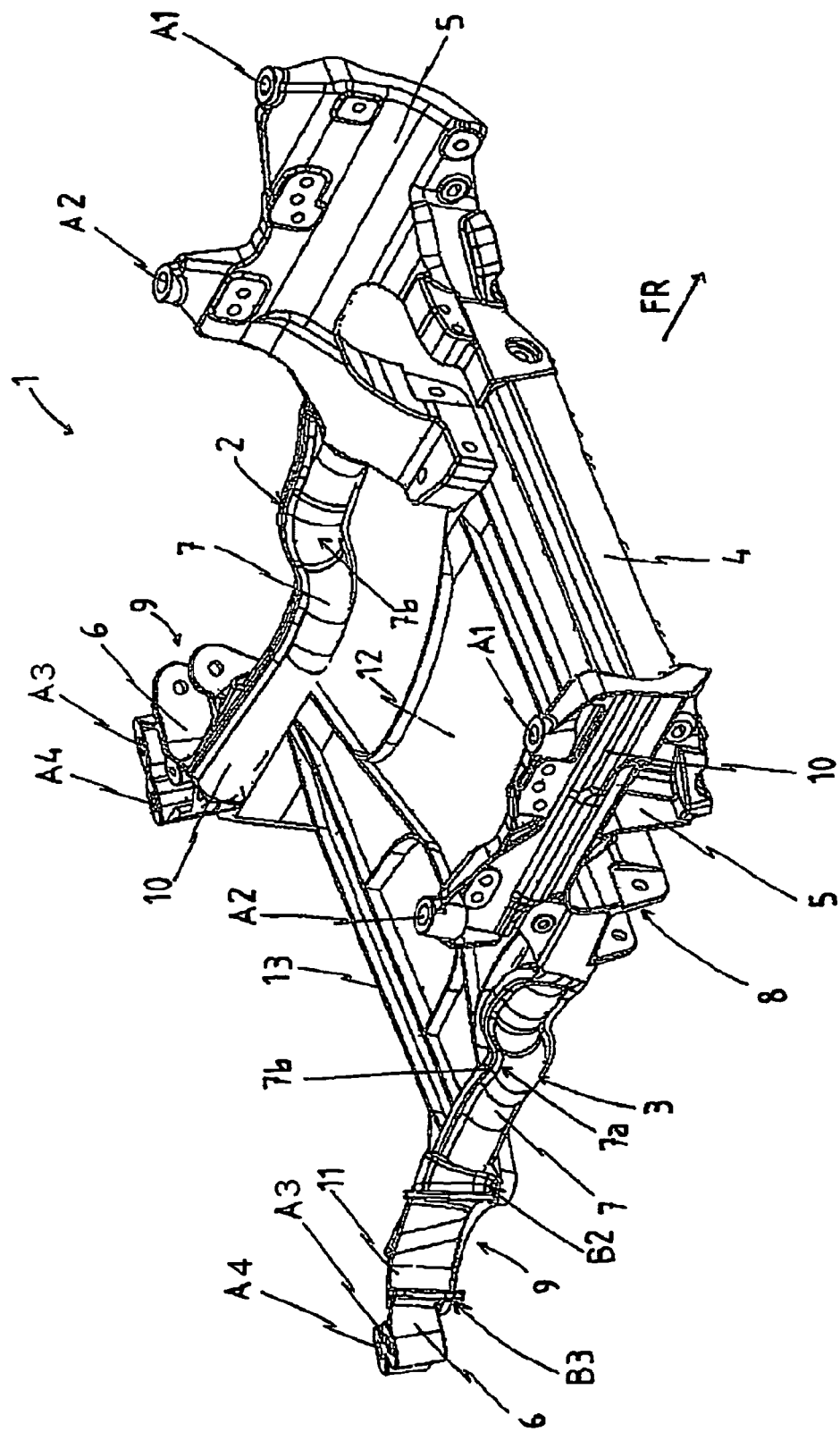

| | | | |
|---|---|---|---|
| 6,109,654 A * | 8/2000 | Yamamoto et al. | 280/784 |
| 6,241,310 B1 * | 6/2001 | Patelczyk | 296/205 |
| 6,409,216 B2 * | 6/2002 | Suzuki | 280/781 |
| 6,511,096 B1 * | 1/2003 | Kunert et al. | 280/785 |
| 6,623,020 B1 * | 9/2003 | Satou | 280/124.109 |
| 6,679,523 B2 * | 1/2004 | Yamamoto et al. | 280/785 |
| 6,739,624 B2 * | 5/2004 | Barber et al. | 280/781 |
| 6,869,090 B2 * | 3/2005 | Tatsumi et al. | 280/124.109 |
| 6,923,474 B2 * | 8/2005 | Frasch et al. | 280/784 |
| 6,979,023 B2 * | 12/2005 | Mikasa et al. | 280/781 |
| 7,097,185 B2 * | 8/2006 | Kato et al. | 280/124.109 |
| 7,273,230 B2 * | 9/2007 | Kiel et al. | 280/781 |
| 7,520,514 B2 * | 4/2009 | Ogawa et al. | 280/124.109 |
| 7,584,815 B2 * | 9/2009 | Ogawa et al. | 180/312 |
| 7,694,982 B2 * | 4/2010 | Kim | 280/124.109 |
| 7,837,230 B2 * | 11/2010 | Mellis et al. | 280/781 |
| 7,845,662 B2 * | 12/2010 | Ogawa et al. | 280/124.109 |
| 7,857,349 B2 * | 12/2010 | Fujiki et al. | 280/785 |
| 7,883,113 B2 * | 2/2011 | Yatsuda | 280/784 |
| 8,083,244 B2 * | 12/2011 | Buschjohann et al. | 280/124.109 |
| 2006/0284449 A1 * | 12/2006 | Miyahara | 296/204 |
| 2007/0024044 A1 * | 2/2007 | Ogawa et al. | 280/788 |
| 2007/0074398 A1 * | 4/2007 | Moon | 29/897.2 |
| 2007/0169982 A1 * | 7/2007 | Ogawa et al. | 180/312 |
| 2009/0322050 A1 * | 12/2009 | Ogawa et al. | 280/124.109 |

* cited by examiner

US 8,684,382 B2

AXLE BRACKET FOR MOTOR VEHICLES

CROSS REFERENCE TO RELATED APPLICATIONS

This application is the National Stage of PCT/DE2009/000713 filed on May 20, 2009, which claims priority under 35 U.S.C. §119 of German Application No. 10 2008 025 100.3 filed on May 26, 2008, German Application No. 10 2008 025 625.0 filed on May 28, 2008, and German Application No. 10 2008 048 125.4 filed on Sep. 20, 2008, the disclosures of which are incorporated by reference. The international application under PCT article 21(2) was not published in English.

The invention relates to an axle bracket, also referred to as a subframe, for a motor vehicle.

Axle brackets serve to accommodate components of the chassis and/or of the power train of the vehicle, and are primarily used in passenger cars. Such axle brackets reinforce the front car structure or also the rear car structure, and for this purpose are firmly connected with or rubber-mounted to the chassis of the vehicle. The rigidity of such an axle bracket is of particular importance. During normal driving operation, high static and dynamic forces often engage on an axle bracket. They are therefore relatively complex components, on which increasingly greater demands are made, particularly since not only does the deformation behavior have to be optimized, with regard to the possibility of a crash, but also, a particularly light but, at the same time, rigid design is desired.

The invention proceeds from a state of the art in accordance with EP 1 787 894 A1.

The invention is based on the task of further developing an axle bracket of the type stated, for a motor vehicle, with regard to the complexity of the cast connection points and the rigidity of the axle bracket, particularly in the regions of the control arm connections.

This task is accomplished by means of an axle bracket having the characteristics according to claim 1.

The axle bracket according to the invention, for a motor vehicle, for accommodating components of the chassis and/or of the power train and/or of the steering of the motor vehicle, essentially comprises a left and right side piece that run essentially in the direction of travel, in each instance, which have at least one, preferably a front and a rear cast connection point, in each instance, and a pipe profile that follows the cast connection point or connects it or links it, preferably that connects or links the two cast connection points of the side piece, whereby the pipe profile is configured, at least in part, in the shape of a half-shell, or in the manner of a half-shell, in the region of the connector to or the connection to the cast connection point.

In the region of the connector or the connection, a hollow, preferably two-shell hollow construction is therefore obtained, which demonstrates particularly great rigidity. As a result, the deformation behavior of the axle bracket with regard to a crash is optimized.

It is essential in connection with the axle bracket according to the invention that the pipe profile is configured to be no longer tubular but rather shell-shaped in the region of the cast connection points. The pipe profile therefore essentially forms a half-shell in this region. The cast connection point is preferably also configured in shell shape in this region, and therefore also essentially forms a half-shell. The two half-shells, linked with one another, thus result in a tubular connection once again. Alternatively, the cast connection point can also have a different profile, not in the shape of a half-shell, but in such a manner that an at least partly hollow construction continues to form when the two parts are connected or linked.

It is practical if the side pieces are connected with one another by way of at least one crosspiece.

An advantageous embodiment of the invention provides that the side pieces are structured with mirror symmetry.

It is advantageous if it is provided that the pipe profile is essentially composed or joined together from two half-shells. Such a pipe profile can be produced in very simple and cost-advantageous manner, but has very good mechanical properties after it has been joined together, particularly with regard to rigidity or deformability or ductility.

Furthermore, it is provided that a front control arm connection is formed on the front cast connection point and/or a rear control arm connection is formed on the rear cast connection point.

Furthermore, it is provided that the cast connection point is configured, in the region of the connector to the pipe profile, which is configured at least in part in the shape of a half-shell, also at least in part in the shape of a half-shell or in the manner of a half-shell, preferably in such a manner that a hollow, preferably tubular construction is formed in the region of the connector.

It is practical if the pipe profile or its half-shell reaches so far to the control arm connection, preferably beyond the front control arm connection, that its advantageous properties, particularly its ductility and deformability, allow the absorption of high longitudinal forces, particularly in the event of a crash.

Furthermore, it is provided that the pipe profile or its half-shell consists of a light metal, preferably of aluminum.

It is advantageous that the half-shells are coupled with one another by means of suitable connection methods, whereby these are preferably fixed on one another by means of material-fit connection methods, preferably by means of welding, or are connected with one another using shape fit, either alone or additionally.

Figure 2:
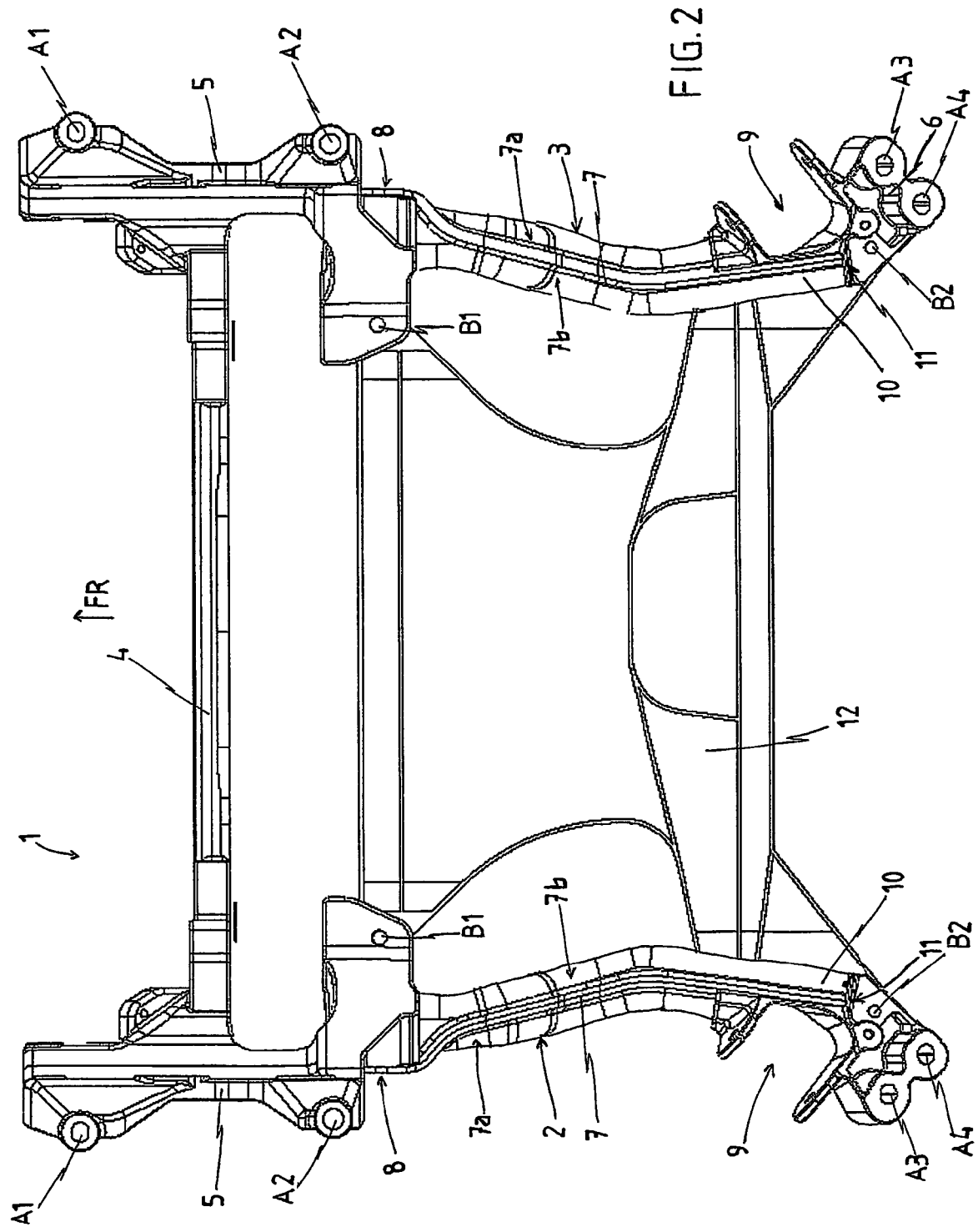

It is furthermore provided that a preferably flat component connects the side pieces with one another and that the component is integrated into the axle bracket by way of preferably several attachment points provided at the cast connection points, whereby the component preferably consists of a casting and/or preferably of a profile, and/or preferably has multiple reinforcement ribs. It is advantageous if the component is disposed in such a manner that it acts between the control arm connections. An outside contour having corresponding attachment points has proven to be particularly advantageous, as it is shown in FIG. 2 of the present patent application. Preferably, the longitudinal sides of the component have an arc shape that is directed inward, in each instance.

An advantageous embodiment provides that the component is a strut intersection. Such a strut intersection is known from EP 1 787 894 A2, the content of which, in this regard, is incorporated into the disclosure content of the present application, by means of explicit reference to it. A further development of the strut intersection provided there provides that a further transverse strut is provided between the rear cast connection points, viewed in the direction of travel. Thus, the strut intersection according to the invention consists of two elongated diagonal struts and two transverse struts.

According to a practical embodiment of the invention, the component is essentially positioned on the underside of the axle bracket.

An advantageous embodiment of the invention provides that the component is produced from light metal, particularly preferably from an aluminum alloy, further particularly preferably using the die-casting method.

Preferably, the component is welded and/or preferably screwed to the cast connection points.

Furthermore, it is provided that the cast connection point is produced from light metal, particularly preferably from an aluminum alloy, further particularly preferably using the die-casting method.

It is practical if preferably multiple screw-on points or attachment points for attaching or fixing the axle bracket in place on the body of the motor vehicle are provided.

An advantageous embodiment of the invention provides that the front control arm connection, viewed in the direction of travel, preferably lies behind or between the screw-on points or attachment points of the front cast connection point, and/or that the preferably two screw-on points or connection points that are present in the region of the rear cast connection point, viewed in the direction of travel, are placed or localized behind or between the rear control arm connection.

Figure 3:
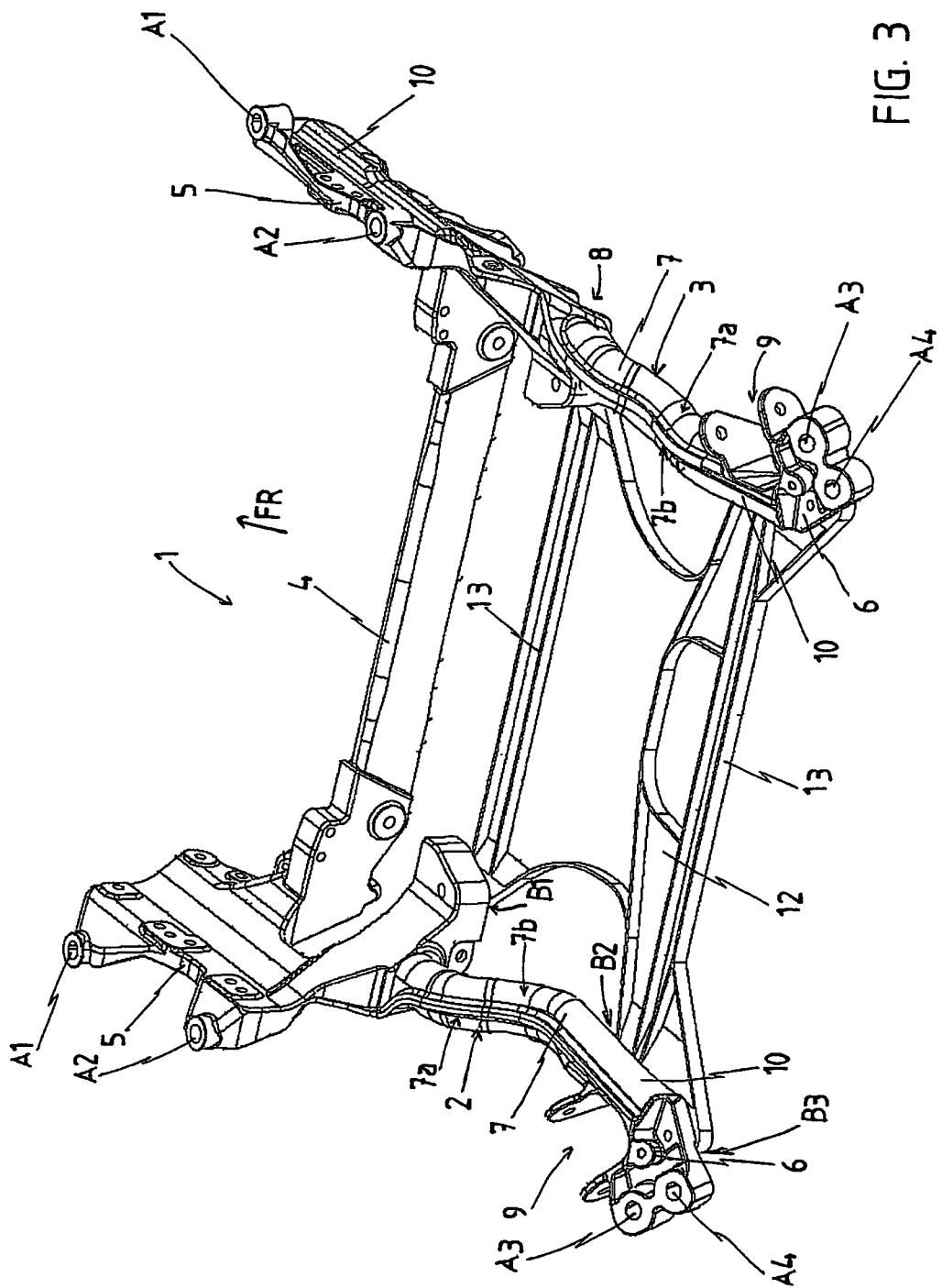
Figure 5:
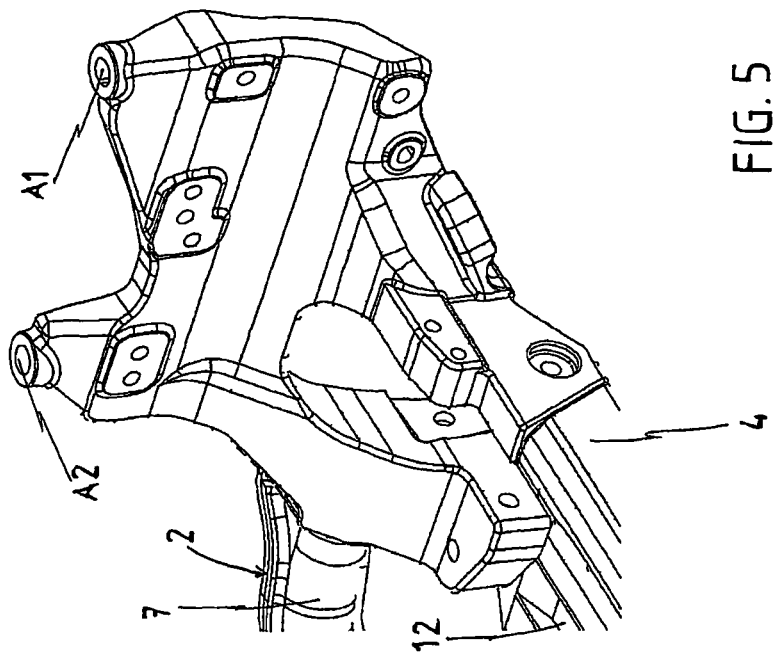
Figure 4:
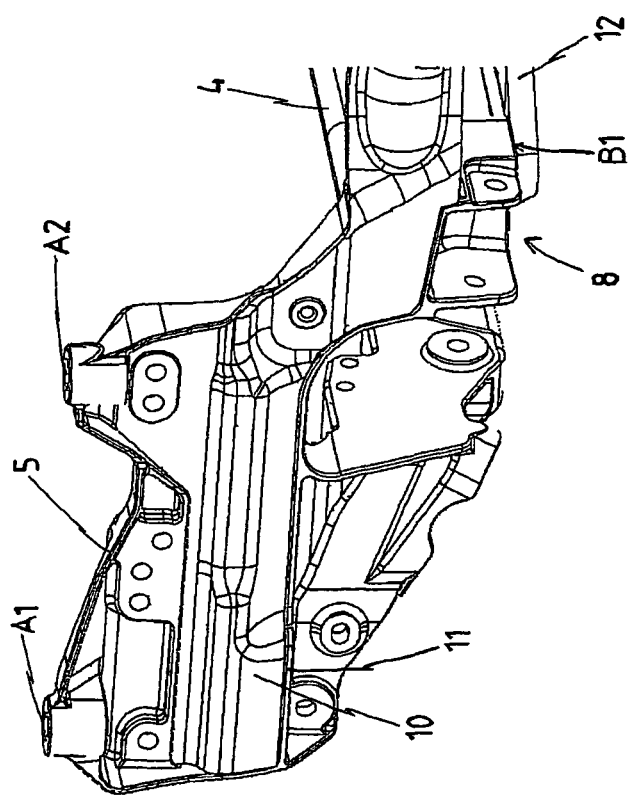
Figure 6:
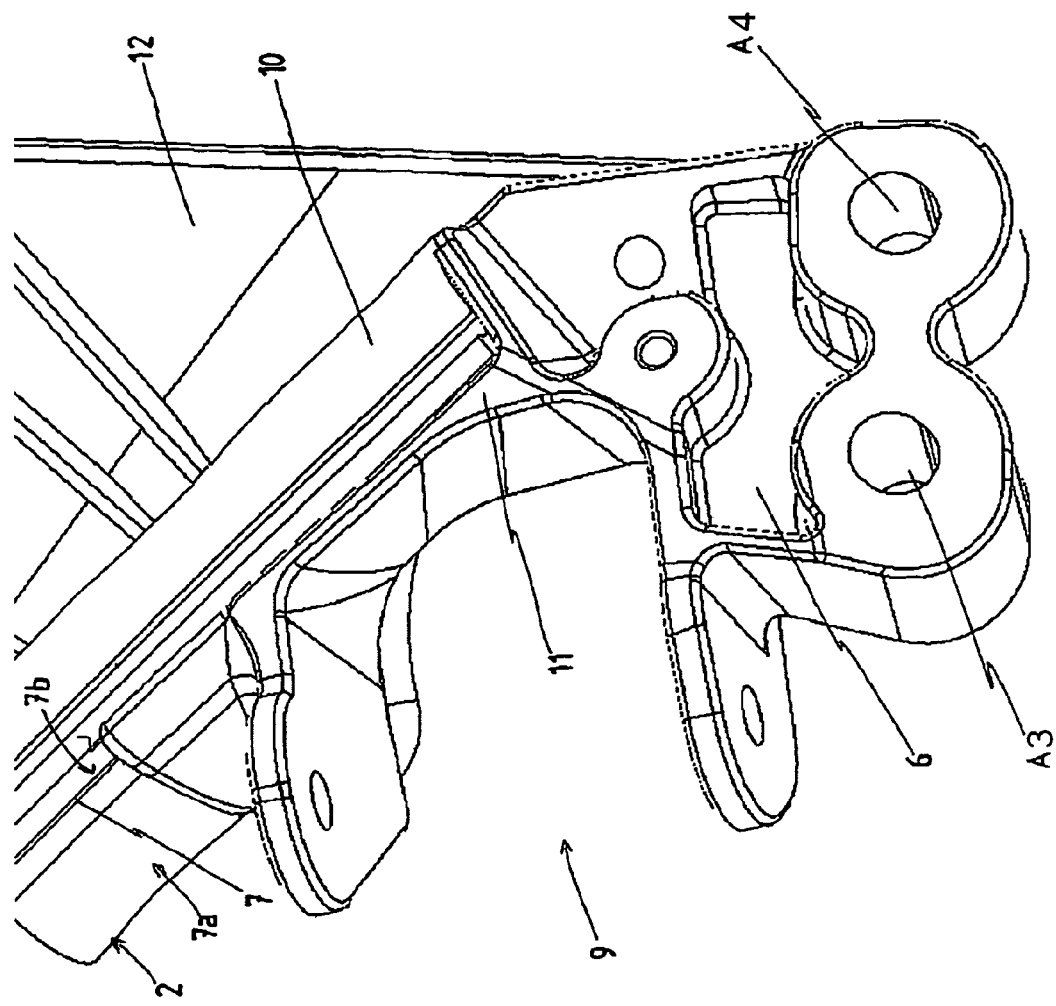

The invention will be explained in greater detail using the exemplary embodiment shown in the drawing. This shows:

FIG. 1 an embodiment of the axle bracket according to the invention, essentially counter to the direction of travel, in a viewing direction at a slant from above, FIG. 2 the axle bracket of FIG. 1 in an upward direction of travel, FIG. 3 the axle bracket of FIG. 1 essentially with the direction of travel, in a viewing direction at a slant from above, FIG. 4 a detail view of the two-shell connection between pipe profile and front cast connection point, according to the invention, FIG. 5 a detail view of the connection between crosspiece and front cast connection point, and FIG. 6 a detail view of the two-shell connection between pipe profile and rear cast connection point, according to the invention.

The description relates to all of FIGS. 1-6. In this connection, the same reference symbols refer to the same components.

The axle bracket 1 according to the invention, which is intended for the front region of a motor vehicle, not shown in any detail, and serves for accommodating components of the chassis and/or of the power train and/or the steering, also not shown in any detail, is composed of two left and right side pieces 2, 3 that run essentially in the direction of travel FR, which are connected with one another by way of a crosspiece 4. The side pieces 2, 3 can be structured with mirror symmetry, and are composed, in each instance, of a front and a rear cast connection point 5, 6 and a pipe profile 7 that connects the cast connection points 5, 6, preferably a pipe profile composed of two half profiles 7a, 7b. A front control arm connection 8 is formed on the front cast connection point 5. A rear control arm connection 9 is situated on the rear cast connection point 6.

It is essential in the axle bracket 1 according to the invention that the pipe profile 7 composed essentially of two half-shells 7a, 7b is configured to be no longer tubular but rather shell-shaped in the region of the cast connection points 5, 6. Therefore, the pipe profile 7 essentially forms a half-shell 10 in this region. The cast connection point 5, 6 is preferably also configured to be shell-shaped in this region, and then also forms essentially a half-shell 11.

By means of the connection of these two parts 10 and 11, whereby at least the pipe profile 7 is configured in shell shape in this region, a hollow, preferably two-shell hollow construction is obtained, which demonstrates particularly great rigidity.

Preferably, the pipe profile or its half-shell 10, which preferably consists of a light metal, particularly preferably of aluminum, reaches so far to the control arm connection 8, 9, preferably beyond the front control arm connection 8, that its advantageous properties, particularly its ductility and deformability, allow the absorption of high longitudinal forces, particularly in the event of a crash. The other half-shell 11 or the cast connection point 5, 6 can thus be structured to be very complex, in advantageous manner, in order to make the numerous connections to the attached parts in cost-advantageous manner. The behavior in the event of a crash then plays a subordinate role for the design of the cast connection point 5, 6.

The half-shells 10, 11 can be coupled with one another by means of suitable connection methods. Preferably, they are fixed in place on one another by means of material-fit connection methods, particularly by means of welding. Shape-fit connections are also possible, which can be provided by themselves or in addition to welding.

In the axle bracket 1 according to the invention, great transverse rigidity is preferably achieved in that a flat component 12, which preferably consists of a casting and/or preferably of a profile and/or which preferably has multiple reinforcement ribs 13, is integrated into the axle bracket 1 by way of preferably multiple attachment points B1, B2, and B3 provided at the cast connection points 5, 6. The flat component 12 is essentially positioned on the underside of the axle bracket 1. Preferably, the component 12 is produced from light metal, particularly preferably from an aluminum alloy, particularly preferably using the die-casting method.

Preferably, the component 12 is screwed onto the cast connection points 5, 6.

This component 12 acts between the control arm connections 8, 9.

The cast connection point 5, 6 preferably consists of light metal, particularly preferably of an aluminum alloy. Preferably, the cast connection point 5, 6 is produced using the die-casting method.

Furthermore, preferably multiple screw-on points A1, A2, A3, and A4 for attaching the axle bracket 1 to the car body, not shown here, are provided. The front control arm connection 8, viewed in the direction of travel, preferably lies behind or between the screw-on points A1, A2 of the front cast connection point 5. The two screw-on points A3, A4 present in the region of the rear cast connection point 6, viewed in the direction of travel, are preferably placed in front, behind, or between the rear control arm connection 9.

REFERENCE SYMBOL LIST (is part of the specification)

1 axle bracket
2 left side piece
3 right side piece
4 crosspiece
5 front cast connection point
6 rear cast connection point
7 pipe profile
8 front control arm connection
9 rear control arm connection
10 half-shell, aluminum profile
11 half-shell, aluminum casting
12 cast component
13 reinforcement ribs A1 screw-on point
A2 screw-on point
A3 screw-on point
A4 screw-on point
B1 attachment point
B2 attachment point
B3 attachment point
FR direction of travel

The invention claimed is:

1. Axle bracket for a motor vehicle, for accommodating components of at least one of a chassis, a power train, and a steering of the motor vehicle, having left and right side pieces that run essentially in a direction of travel, which have a front and a rear cast connection point, in each instance, and a respective pipe profile that follows the front cast connection point and that connects the front and rear cast connection points, respectively,
wherein a front control arm connection is formed on the front cast connection point,
wherein a rear control arm connection is formed on the rear cast connection point,
wherein the respective pipe profile has no control arm connection, and
wherein the respective pipe profile is configured, at least in part, in the shape of a half-shell, in a connection region of at least one of the front and rear cast connection points to the pipe profile.

2. Axle bracket according to claim 1, wherein the side pieces are connected with one another by way of a crosspiece.

3. Axle bracket according to claim 1, wherein the side pieces are structured with mirror symmetry.

4. Axle bracket according to claim 1, wherein the respective pipe profile is composed essentially of two half-shells.

5. Axle bracket according to claim 1, wherein each the respective pipe profile or the half-shell reaches so far to the front or the rear control arm connection that ductility and deformability allow absorption of high longitudinal forces in an event of a crash.

6. Axle bracket according to claim 1, wherein the respective pipe profile or a half-shell of each respective pipe profile comprises a light metal.

7. Axle bracket according to claim 1, wherein each of the front and the rear cast connection points is produced from light metal.

8. Axle bracket according to claim 1, wherein at least one screw-on point is provided for attaching the axle bracket to the body of the motor vehicle.

9. Axle bracket according to claim 1, wherein the front cast connection point comprises a first screw-on point and a second screw-on point for attaching the axle bracket to the body of the motor vehicle,
wherein the rear cast connection point comprises a first screw-on point and a second screw-on point for attaching the axle bracket to the body of the motor vehicle,
wherein the front control arm connection, viewed in the direction of travel, lies behind or between the first and second screw-on points of the front cast connection point, and
wherein the first and second screw-on points of the rear cast connection point, viewed in the direction of travel, are placed or localized behind or between the rear control arm connection.

10. Axle bracket according to claim 1, wherein the at least one of the front and rear cast connection points in the connection region forms a hollow construction.

11. Axle bracket according to claim 10, wherein the respective pipe profile comprises at least one half-shell,
wherein the hollow construction of the at least one of the front and the rear cast connection points is configured at least in part in the shape of a half-shell, and
wherein the at least one half-shell of the pipe profile and the at least one of the front and the rear cast connection points or the half-shell of the at least one of the front and the rear cast connection points are coupled with one another via at least one connection method selected from the group consisting of a material-fit welding, and a shape fit.

12. Axle bracket according to claim 10, wherein the hollow construction of the at least one front and the rear cast connection points is configured at least in part in the shape of a half-shell.

13. Axle bracket according to claim 1, wherein a component connects the side pieces with one another, and
wherein the component is integrated into the axle bracket by way of at least one attachment point provided at the front or the rear cast connection point.

14. Axle bracket according to claim 13, wherein the component is a strut intersection.

15. Axle bracket according to claim 13, wherein the component is essentially positioned on an underside of the axle bracket.

16. Axle bracket according to claim 13, wherein the component is produced from light metal.

17. Axle bracket according to claim 13, wherein the component is welded or screwed to the front or the rear cast connection point of each of the left and right side pieces.

18. Axle bracket according to claim 13, wherein the component connecting the side pieces with one another is configured to be flat.

19. Axle bracket according to claim 13, wherein the component connecting the side pieces with one another comprises a casting.

20. Axle bracket according to claim 13, wherein the component connecting the side pieces with one another comprises a profile.

21. Axle bracket according to claim 13, wherein the component connecting the side pieces with one another has multiple reinforcement ribs.

* * * * *

UNITED STATES PATENT AND TRADEMARK OFFICE
CERTIFICATE OF CORRECTION

| | | |
|---|---|---|
| PATENT NO. | : 8,684,382 B2 | Page 1 of 1 |
| APPLICATION NO. | : 12/736953 | |
| DATED | : April 1, 2014 | |
| INVENTOR(S) | : Buschjohann et al. | |

It is certified that error appears in the above-identified patent and that said Letters Patent is hereby corrected as shown below:

In the Claims:

Column 5, line 35 (line 1 of Claim 5) after the word "wherein" please delete: "each".

Signed and Sealed this
First Day of July, 2014

Michelle K. Lee
*Deputy Director of the United States Patent and Trademark Office*